United States Patent
Fritsch et al.

(10) Patent No.: US 10,569,684 B2
(45) Date of Patent: Feb. 25, 2020

(54) METHOD FOR MANUFACTURING A HEADREST COMPRISING AN INTEGRATED FUNCTIONAL MODULE

(71) Applicant: Adient Luxembourg Holding S.à.r.l., Luxembourg (LU)

(72) Inventors: Christophe Fritsch, Souffelweyersheim (FR); Felix Manduzio, Illkirch-Graffenstaden (FR); Christophe Morinière, Holtzheim (FR)

(73) Assignee: ADIENT LUXEMBOURG HOLDING S.À.R.L., Luxembourg (LU)

( * ) Notice: Subject to any disclaimer, the term of this patent is extended or adjusted under 35 U.S.C. 154(b) by 140 days.

(21) Appl. No.: 15/560,285

(22) PCT Filed: Mar. 23, 2016

(86) PCT No.: PCT/EP2016/056400
§ 371 (c)(1),
(2) Date: Sep. 21, 2017

(87) PCT Pub. No.: WO2016/151022
PCT Pub. Date: Sep. 29, 2016

(65) Prior Publication Data
US 2018/0072204 A1    Mar. 15, 2018

(30) Foreign Application Priority Data
Mar. 23, 2015    (DE) .......................... 10 2015 205 241

(51) Int. Cl.
*B60N 2/879*    (2018.01)
*B60R 11/02*    (2006.01)
(Continued)

(52) U.S. Cl.
CPC .............. *B60N 2/879* (2018.02); *B29C 65/48* (2013.01); *B60R 11/0217* (2013.01);
(Continued)

(58) Field of Classification Search
CPC .. B60N 2/879; B60N 2002/899; B29C 65/48; B29L 2031/3055; B60R 11/0217; B60R 2011/0017
(Continued)

(56) References Cited

U.S. PATENT DOCUMENTS 3,512,605 A * 5/1970 McCorkle .............. H04R 5/023
381/301
4,027,112 A * 5/1977 Heppner .................. A47C 7/38
381/182
(Continued)

FOREIGN PATENT DOCUMENTS

CN    201 895 624 U    7/2011
DE    198 40 444 A1    5/1999
(Continued)

*Primary Examiner* — Mark R Wendell
(74) *Attorney, Agent, or Firm* — Marshall & Melhorn, LLC

(57) ABSTRACT

A method is provided for manufacturing a headrest. The headrest includes an integrated functional module. The method includes mounting the functional module on a supporting rod and enclosing the functional module mounted on the supporting rod with a housing (102), which is fitted on a front part (104), and a rear part (302) and introducing a cable tube (208) into a hole (502) in the front part (104) or in the rear part (302). The cable tube (208) serves for receiving a cable fastening the front part (104), the rear part (302) and the supporting rod (204) using a fastening device.

20 Claims, 5 Drawing Sheets

(51) Int. Cl.
  *B29C 65/48* (2006.01)
  *B60R 11/00* (2006.01)
  *B60N 2/80* (2018.01)
  *B29L 31/30* (2006.01)

(52) U.S. Cl.
  CPC . *B29L 2031/3055* (2013.01); *B60N 2002/899* (2018.02); *B60R 2011/0017* (2013.01)

(58) Field of Classification Search
  USPC ................................ 297/217.4, 217.5, 217.3
  See application file for complete search history.

(56) References Cited

U.S. PATENT DOCUMENTS

| | | | | |
|---|---|---|---|---|
| 5,287,412 | A * | 2/1994 | Etzel | B60R 11/0217 |
| | | | | 181/156 |
| 6,669,285 | B1 * | 12/2003 | Park | B60R 11/0235 |
| | | | | 297/217.3 |
| 2001/0000419 | A1 * | 4/2001 | Heilig | B60N 2/427 |
| | | | | 297/410 |
| 2002/0018576 | A1 * | 2/2002 | Shima | H04R 1/025 |
| | | | | 381/396 |
| 2004/0212745 | A1 * | 10/2004 | Chang | B60R 11/0235 |
| | | | | 348/837 |
| 2006/0128475 | A1 | 6/2006 | Vitito | |
| 2008/0252798 | A1 * | 10/2008 | Vitito | B60K 35/00 |
| | | | | 348/837 |
| 2010/0148550 | A1 | 6/2010 | Kidd | |
| 2012/0161481 | A1 | 6/2012 | Tache et al. | |
| 2012/0280542 | A1 * | 11/2012 | Wood | B60N 2/879 |
| | | | | 297/180.1 |
| 2016/0039320 | A1 * | 2/2016 | Subat | B29C 45/14311 |
| | | | | 297/217.5 |
| 2016/0257227 | A1 * | 9/2016 | Takada | B60R 11/0217 |
| 2017/0008434 | A1 * | 1/2017 | Chang | B60R 11/02 |
| 2017/0080876 | A1 * | 3/2017 | Chang | B60N 2/879 |
| 2017/0106775 | A1 * | 4/2017 | Takada | B60N 2/80 |
| 2017/0154006 | A1 * | 6/2017 | Tuccinardi | G06F 13/4081 |
| 2017/0267137 | A1 * | 9/2017 | Subat | B60N 2/809 |

FOREIGN PATENT DOCUMENTS

| | | |
|---|---|---|
| JP | H2-10698 U | 1/1990 |
| JP | 2002-59434 A | 2/2002 |
| JP | 2007-145276 A | 6/2007 |
| JP | 2007 238005 A | 9/2007 |
| WO | 95/06573 A1 | 3/1995 |
| WO | 98/57820 A1 | 12/1998 |

* cited by examiner

METHOD FOR MANUFACTURING A HEADREST COMPRISING AN INTEGRATED FUNCTIONAL MODULE

CROSS REFERENCE TO RELATED APPLICATIONS

This application is a United States National Phase Application of International Application PCT/EP2016/056400, filed Mar. 23, 2016, and claims the benefit of priority under 35 U.S.C. § 119 of German Application 10 2015 205 241.9, filed Mar. 23, 2015, the entire contents of which are incorporated herein by reference.

FIELD OF THE INVENTION

The present invention relates to a method for manufacturing a headrest comprising an integrated functional module.

BACKGROUND OF THE INVENTION

The methods known in the prior art for manufacturing a headrest comprising an integrated functional module do not lead to the production of serviceable headrests which meet the criteria required by ECE 17.

SUMMARY OF THE INVENTION

It is an object of the present invention to make available a method for manufacturing a headrest comprising an integrated functional module that leads to the production of serviceable headrests comprising an integrated functional module that meet the criteria required by the ECE 17 regulation.

The object of the present invention is achieved by a method for manufacturing a headrest comprising an integrated functional module, wherein the method comprises the following method steps: mounting the functional module on a supporting rod of a vehicle seat; and enclosing the functional module mounted on the supporting rod by means of a housing, which is fitted on a front part, and a rear part; and introducing a cable tube into a hole in the front part or in the rear part, wherein the cable tube serves for receiving a cable; fastening the front part, the rear part and the supporting rod using fastening means.

By contrast with the prior art, the method according to the invention thus has the advantage that a headrest can be manufactured in a modular manner and any desired functional module can be integrated into the headrest.

In a further embodiment, the method comprises the method step that side parts with acoustic covers are fitted laterally on the housing.

In a further embodiment, the method comprises the method step that the acoustic covers are adhesively bonded at their edge region to the side parts.

In a further embodiment, provision is made for the fastening means to comprise clips of the front part and/or of the rear part.

This has the advantage that, in spite of stability, a certain degree of elasticity is delivered, with the result that the probability of an undesired operating noise or undesired operating noises can be reduced.

In a further embodiment, provision is made for the cable tube to be introduced into the hole in the front part or in the rear part until a carrier flange of the cable tube substantially fills the hole.

In a further embodiment, provision is made for the functional module to be a loudspeaker unit.

In a further embodiment, provision is made for the housing to comprise high-density polyethylene (HDPE).

In a further embodiment, provision is made for the front part to comprise polycarbonate/acrylonitrile-butadiene-styrene (ABS-PC).

In a further embodiment, provision is made for the cable tube to comprise polycaprolactam (PA 6).

This has the advantage that the stability criteria of the ECE 17 regulation are observed.

The invention further relates to a headrest comprising an integrated functional module.

Further details, features and advantages of the invention will emerge from the drawings and from the following description of preferred embodiments with reference to the drawings. Here, the drawings illustrate merely exemplary embodiments of the invention which do not limit the essential concept of the invention. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
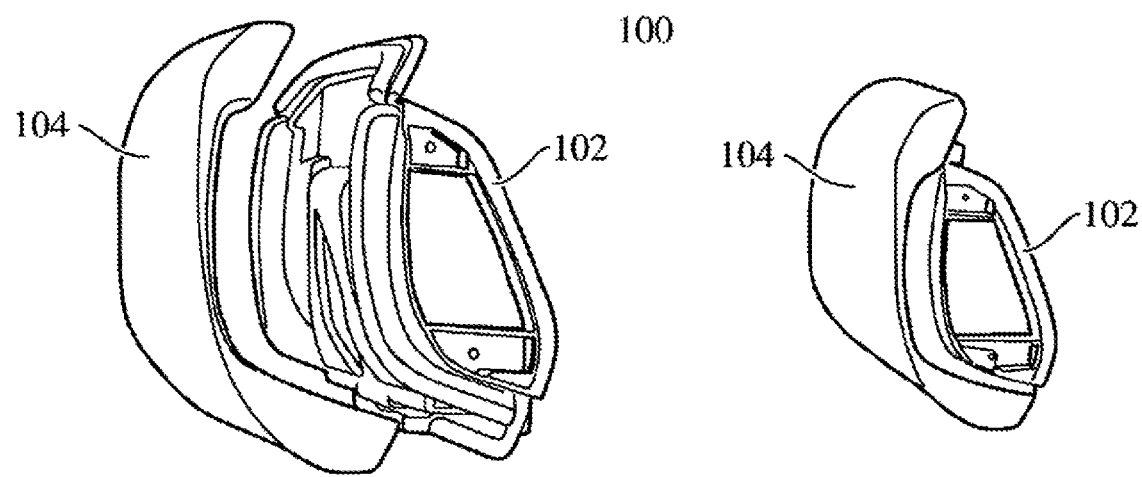
FIG. 1 is a view showing a method step 100 in which a housing 102 is mounted on the front part 104 of the headrest 1000 according to the invention.

Referring to the drawings, FIG. 1 shows the method step 100 in which a housing 102 is mounted on the front part 104 of the headrest 1000 according to the invention, wherein the front part 104 can be mounted on the housing 102 by means of hooks, for example. A foam covering can be embedded between the housing 102 on the front part 104 in order to avoid an undesired operating noise or undesired operating noises. The housing 102 can consist for example of high-density polyethylene (HDPE). The front part 104 can consist for example of polycarbonate/acrylitrile-butadiene-styrene (ABS-PC). The front part 104 can further have reinforcing lines in order to reduce the probability of a breakage.

Figure 2:
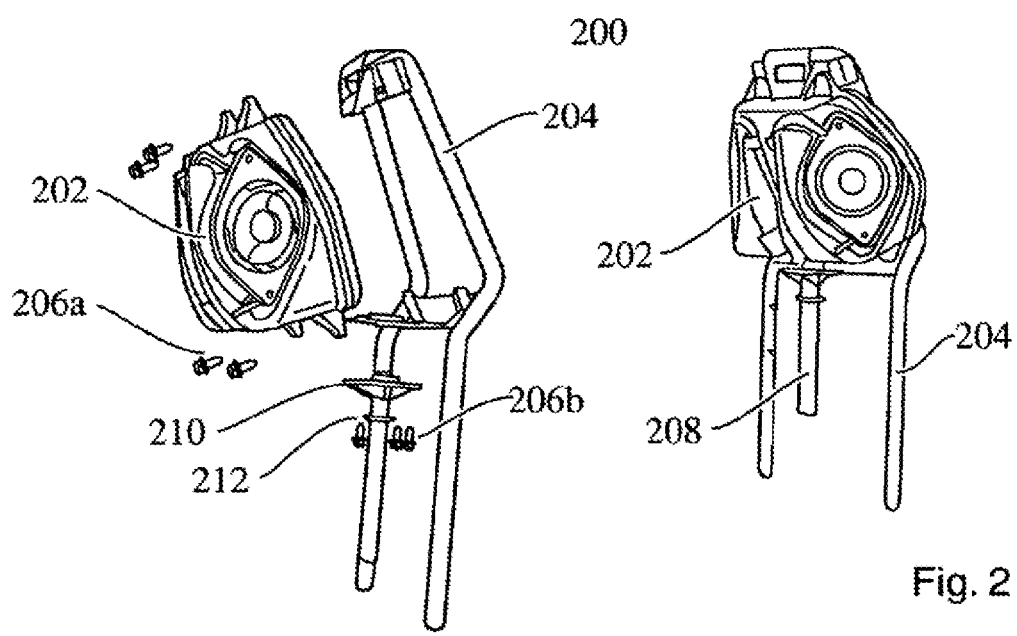
FIG. 2 is a view showing a method step 200 in which a U-shaped supporting rod 204 is equipped with a loudspeaker unit 202.

FIG. 2 shows the method step 200 in which a U-shaped supporting rod 204 is equipped with a loudspeaker unit 202, with the loudspeaker unit 202 being fastened to the U-shaped supporting rod 204 by means of screws 206 a,b. A cable tube 208 is mounted on the loudspeaker unit 202 and is designed to receive a cable and a connecting cable of the loudspeaker unit 202. The cable tube 208 has a fastening plate 210 and a carrier flange 212 in order to impart additional stability in the mounted state. The cable tube 208 can consist for example of polycaprolactam (PA 6). The U-shaped supporting rod 204 can consist for example of chromium. The U-shaped supporting rod 204 can have horizontally extending plates which connect the two legs and into which there are punched holes into which screws for fixing the loudspeaker unit 202 can be punched. Furthermore, these horizontally extending plates can have cutouts which are designed to receive the clips for example of the front part 104 or of the rear part 302 and thus to fix the components of the headrest with respect to one another.

Figure 3:
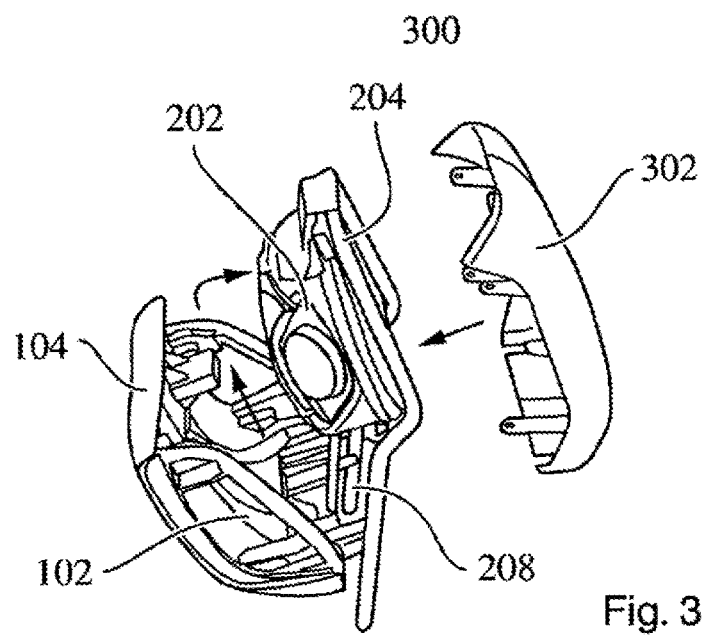
FIG. 3 is a view showing a method step 300 in which a mounting-together of the housing 102, the U-shaped supporting rod 204 with mounted-on loudspeaker unit 202 and a rear part 302 of the headrest according to the invention takes place.

FIG. 3 shows the method step 300 in which a mounting-together of the housing 102, the U-shaped supporting rod 204 with mounted-on loudspeaker unit 202 and a rear part 302 of the headrest according to the invention takes place. Here, the housing 102 together with the front part 104 are moved upward from below toward the U-shaped supporting rod 204, with the cable tube 208 being introduced into a hole in the housing 102 and the housing then being rotated further in the direction of the U-shaped supporting rod 204. The primary task of the housing 102 is to receive the loudspeaker unit 202. For this purpose, the housing 102 has special projections and indentations in order to fix a defined position of the loudspeaker unit 202. The rear part 302 is moved from the rear toward the U-shaped supporting rod 204. Said components can be connected to one another for example by means of clips which are fitted on the front part 104, for example.

Figure 4:
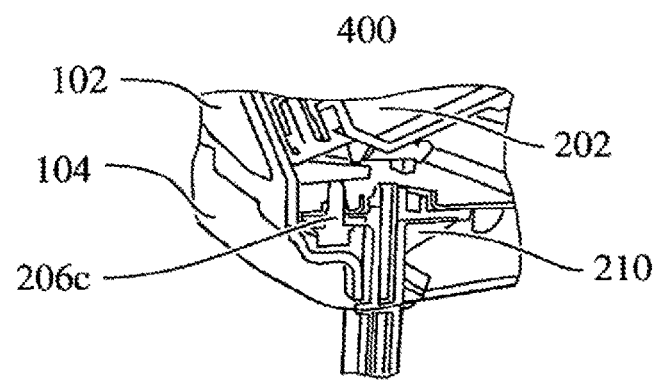
FIG. 4 is a view showing a positioning of the cable tube 208 into the hole 502 in the front part 104.

FIG. 4 shows how the cable tube 208 has been positioned into the hole 502 in the front part 104. A screw 206c is used to fasten the fastening plate 201 to a plate-shaped component of the headrest or else for example to one of the horizontally extending plates of the U-shaped supporting rod 204. The carrier flange 212 of the cable tube 208 is situated at the height of the hole 502 in the front part 104.

Figure 5:
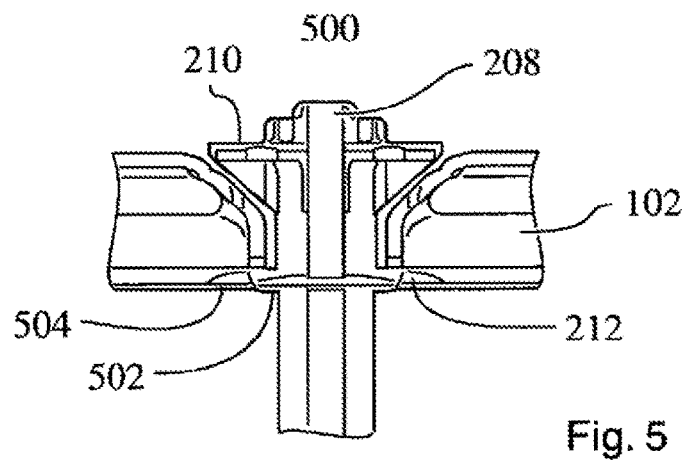
FIG. 5 is a view showing a carrier flange 212 pressing a fabric structure of a cladding against the front part 104.

As is visible in FIG. 5, the carrier flange 212 is designed to press a fabric structure of a cladding against the front part 102, with the result that the edges of the hole 502 are closed. At the same time, the probability for the occurrence of an undesired operating noise or undesired operating noises is reduced.

Figure 6:
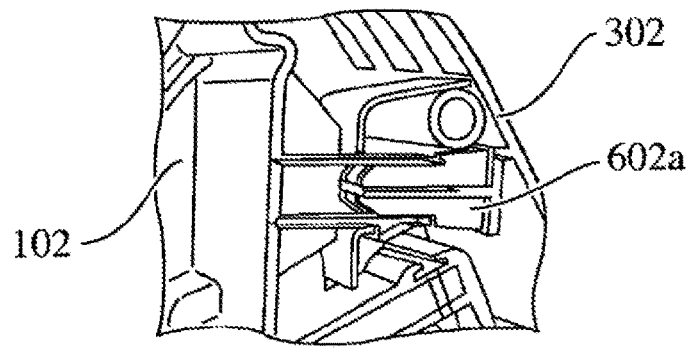
FIG. 6 is a view showing fastening of the rear part 302 and the supporting rod 204 to the housing in the upper part of the headrest 1000.

FIG. 6 shows the fastening of the rear part 302 and the supporting rod 204 to the housing in the upper part of the headrest 1000. The rear part 302 and the front part 104 are connected to one another by means of a fastening clip 602a of the rear part 302 which is received in a fork-like structure of the front part 104. The upper arc part of the U-shaped supporting rod 204 extends transversely above the fastening clip 602a.

Figure 7:
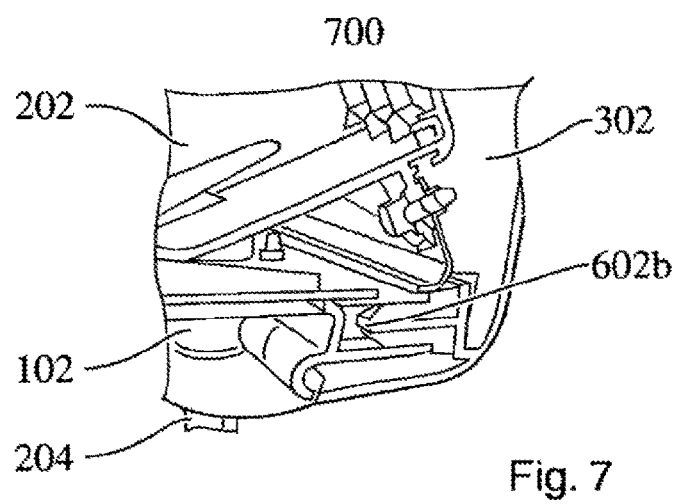
FIG. 7 is a view showing fastening of the rear part 302 and the supporting rod 204 to the housing in the lower part of the headrest 1000.

FIG. 7 shows the fastening operation 700 for fastening the rear part 302 and the supporting rod 204 to the housing in the lower part of the headrest 1000. The rear part 302 and the front part 104 are connected to one another by means of a further fastening clip 602b of the rear part 302 which is received in a further fork-like structure of the front part 104. FIG. 7 likewise shows how screws can be used to fasten the loudspeaker unit 202 to one of the horizontally extending plates of the U-shaped supporting rod 204.

Figure 8:
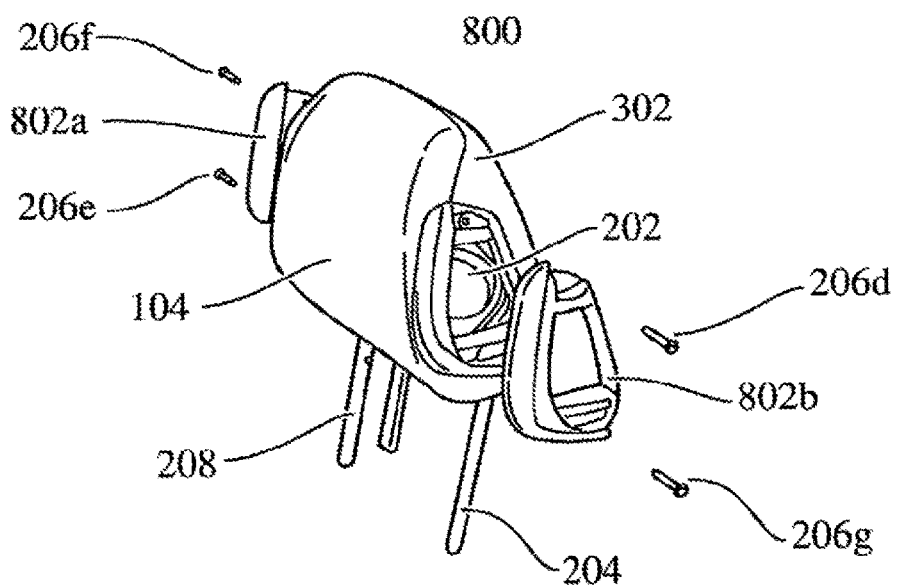
FIG. 8 is a view showing a fastening operation 800 for fastening side parts 802 a,b.

FIG. 8 shows the fastening operation 800 for fastening side parts 802 a,b to the previously mounted-together components of the headrest by means of screws 206 g,h. The side parts 802 a,b can consist for example of polycarbonate/acrylitrile-butadiene-styrene (ABS-PC). They are provided centrally with a cutout.

Figure 9:
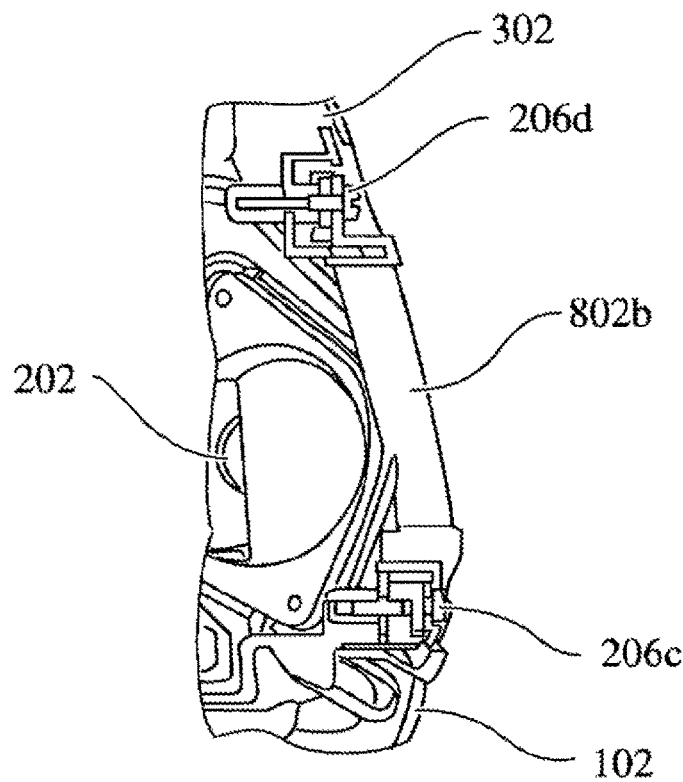
FIG. 9 is a frontal sectional view of the interior of the headrest.

FIG. 9 shows a frontal sectional view of the interior of the headrest, with only a part of the loudspeaker unit 202 and one of the laterally mounted side parts 802 b being shown. A screw 206c in the lower region provides fastening to the front part 104 and a screw 206d in the upper region provides fastening to the rear part 302.

Figure 10:
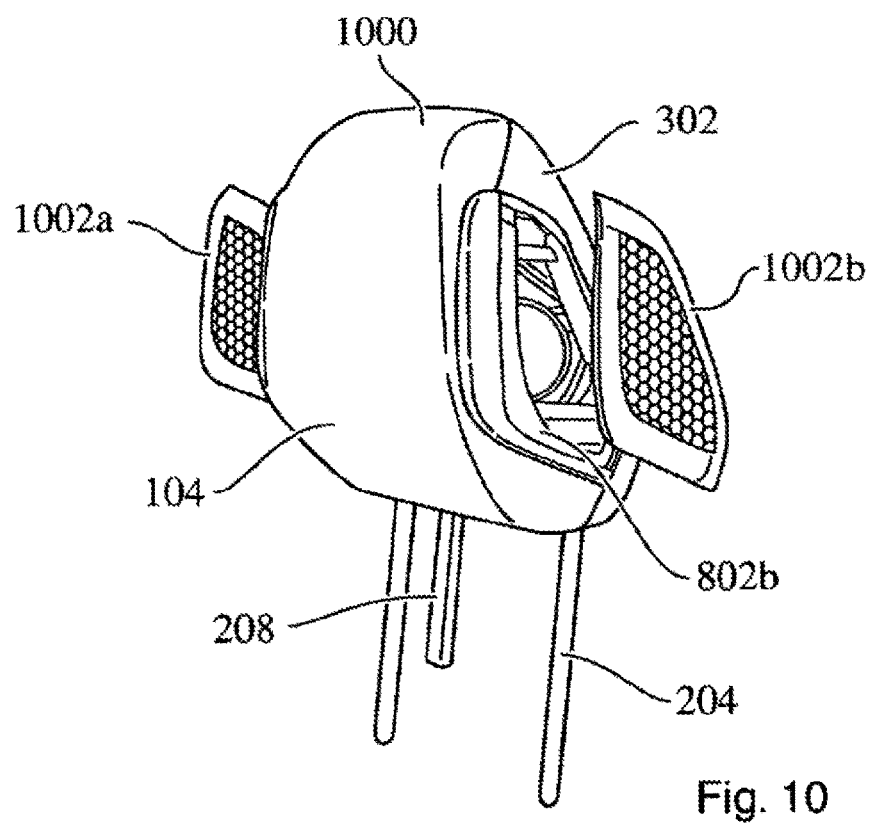
FIG. 10 is a view showing a method step in which acoustic covers 1002 a,b are placed on the side parts 802a,b.

FIG. 10 shows the method step in which acoustic covers 1002 a,b having a frame and central honeycomb-like structures are placed on the side parts 802a,b. Fastening is preferably achieved by means of adhesive bonding in the region of the frame. For this purpose, the acoustic covers 1002 a,b preferably consist of polycarbonate/acrylitrile-butadiene-styrene (ABS-PC). The material thickness is reduced in the region of the honeycomb-like structures in order to improve acoustic performance. Applied congruent honeycomb-like fabric structures also make it possible to positively influence the sound quality of the integrated loudspeaker unit 202.

Figure 11:
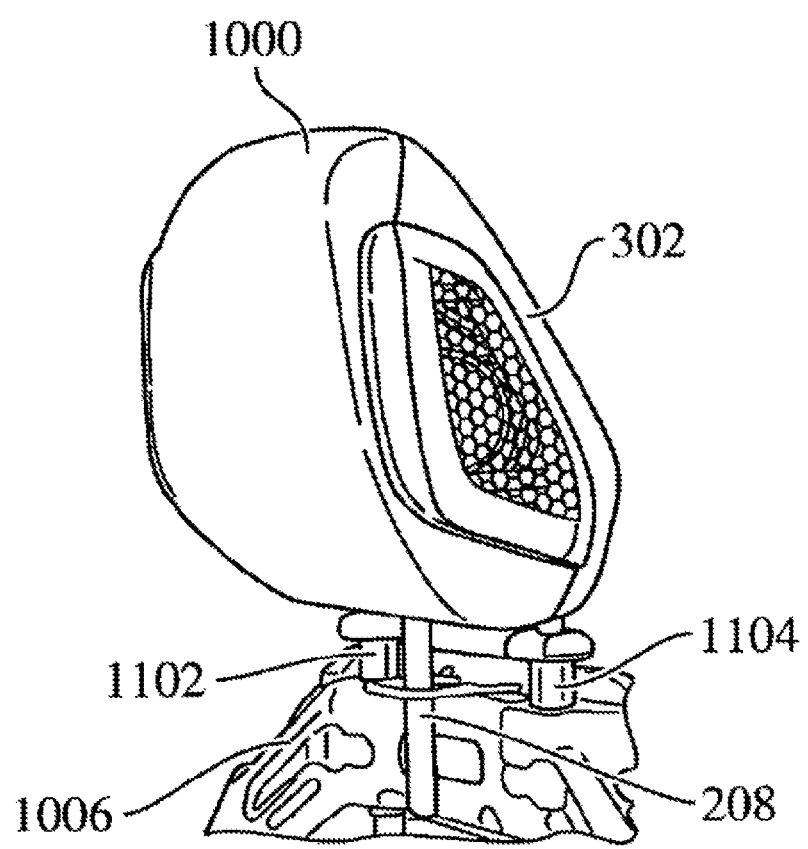
FIG. 11 is a view of a headrest 1000 according to the invention mounted on a seat frame 1106.

FIG. 11 shows the headrest 1000 according to the invention mounted on a seat frame 1106 of a vehicle seat. Each of the legs of the U-shaped supporting rod 204 is situated in a stay 1102 or 1104 so as to be displaceable therein and fixable in certain positions, it being possible for the first and/or the second stay to have elastic springs, for example, in order to impart elasticity on the one hand and stability. The cable tube 208 extends ventrally from the seat frame 1006 and preferably extends in the seat cushion of the vehicle seat.

While specific embodiments of the invention have been shown and described in detail to illustrate the application of the principles of the invention, it will be understood that the invention may be embodied otherwise without departing from such principles.

The invention claimed is:

1. A method for manufacturing a headrest comprising an integrated functional module, wherein the method comprises the steps of:
   mounting the functional module on a supporting rod of a vehicle seat;
   enclosing the functional module mounted on the supporting rod by means of a housing, which is fitted on a front part, and a rear part after mounting the functional module on the supporting rod of the vehicle seat;
   introducing a cable tube into a hole in the front part or in the rear part, wherein the cable tube serves for receiving a cable; and
   fastening the front part, the rear part and the supporting rod using a fastening means.

2. The method as claimed in claim 1, wherein the method further comprises the step of:
   fitting side parts with acoustic covers laterally on the housing.

3. The method as claimed in claim 2, wherein the method comprises the step of:
adhesively bonding the acoustic covers at edge regions thereof to the side parts.

4. The method as claimed in claim 1, wherein the fastening means comprises clips of the front part and/or of the rear part, the front part being arranged on one side of the support rod, the rear part being arranged on another side of the support rod, the one side being located opposite the another side.

5. The method as claimed in claim 1, wherein the cable tube is introduced into the hole in the front part or in the rear part until a carrier flange of the cable tube substantially fills the hole, the cable tube being located at a spaced location from the supporting rod.

6. The method as claimed in claim 1, wherein the functional module is a loudspeaker unit, the cable tube being mounted on the loudspeaker unit, wherein the cable tube extends in a downward direction away from the loudspeaker unit.

7. The method as claimed in claim 1, wherein the housing comprises high-density polyethylene (HDPE).

8. The method as claimed in claim 1, wherein the front part comprises polycarbonate/acrylitrile-butadiene-styrene (ABS-PC), the front part being part of a headrest structure, the front part comprising a user contact surface configured to contact at least a portion of a head of a user of the headrest structure.

9. The method as claimed in claim 1, wherein the cable tube comprises polycaprolactam (PA 6).

10. A headrest comprising:
a supporting rod of a vehicle seat;
a housing;
a front part;
a rear part;
a fastening means for fastening the front part to the housing and fastening the rear part to the housing;
a cable tube; and
an integrated functional module, wherein the headrest is manufactured by the steps comprising:
mounting the functional module on the supporting rod;
enclosing the functional module mounted on the supporting rod by the housing after mounting the functional module on the supporting rod;
fitting the housing on the front part and fitting the housing on a rear part;
introducing the cable tube into a hole in the front part or in the rear part, wherein the cable tube serves for receiving a cable; and
fastening the front part, the rear part and the supporting rod using a fastening means.

11. The headrest as claimed in claim 10, further comprising side parts with acoustic covers, wherein the side parts with acoustic covers are fitted laterally on the housing.

12. The headrest as claimed in claim 11, wherein the acoustic covers are adhesively bonded at edge regions thereof to the side parts.

13. The headrest as claimed in claim 10, wherein the fastening means comprises clips of the front part and/or of the rear part, the front part being arranged on one side of the support rod, the rear part being arranged on another side of the support rod, the one side being located opposite the another side.

14. The headrest as claimed in claim 10, wherein the cable tube is introduced into the hole in the front part or in the rear part until a carrier flange of the cable tube substantially fills the hole, the cable tube being located at a spaced location from the supporting rod.

15. The headrest as claimed in claim 10, wherein the functional module is a loudspeaker unit, the cable tube being mounted on the loudspeaker unit, wherein the cable tube extends in a downward direction away from the loudspeaker unit.

16. The headrest as claimed in claim 10, wherein the housing comprises high-density polyethylene (HDPE).

17. The headrest as claimed in claim 10, wherein the front part comprises polycarbonate/acrylitrile-butadiene-styrene (ABS-PC), the front part being part of a headrest structure, the front part comprising a user contact surface configured to contact at least a portion of a head of a user of the headrest structure.

18. The headrest as claimed in claim 10, wherein the cable tube comprises polycaprolactam.

19. A headrest comprising:
a supporting rod of a vehicle seat;
a housing;
a front part;
a rear part;
a fastening means for fastening the front part to the housing and fastening the rear part to the housing;
a cable tube; and
an integrated functional module, the front part being arranged on one side of the integrated functional module, the rear part being located on another side of the integrated functional module, the one side being located opposite the another side, wherein the headrest is manufactured by the steps comprising:
mounting the functional module on the supporting rod;
enclosing the functional module mounted on the supporting rod by the housing after mounting the functional module on the supporting rod;
fitting the housing on the front part and fitting the housing on a rear part;
introducing the cable tube into a hole in the front part or in the rear part, wherein the cable tube serves for receiving a cable; and
fastening the front part, the rear part and the supporting rod using a fastening means.

20. The headrest as claimed in claim 19, wherein at least a portion of the housing is located on the one side of the integrated functional module, the cable tube being located at a spaced location from the supporting rod.

* * * * *